United States Patent [19]

Blackburn et al.

[11] 4,326,152

[45] Apr. 20, 1982

[54] SYSTEM FOR CONTROLLING THE IN-PHASE OPERATION OF A PAIR OF MOTORS

[75] Inventors: James M. Blackburn, Whitsett; Douglas C. Paschall, Welcome, both of N.C.

[73] Assignee: Western Electric Co., Inc., New York, N.Y.

[21] Appl. No.: 85,343

[22] Filed: Oct. 15, 1979

[51] Int. Cl.³ .................... H02P 5/46; B65H 57/28
[52] U.S. Cl. ................................. 318/85; 318/78; 242/158.4 R
[58] Field of Search ............. 318/85, 78, 41, 59, 318/68–71, 77; 242/158 R, 158.4 R, 93 R

[56] References Cited

U.S. PATENT DOCUMENTS

| | | | |
|---|---|---|---|
| 3,314,452 | 4/1967 | Cartwright et al. | 242/93 R |
| 3,408,549 | 10/1968 | Shimabukuro | 318/85 |
| 3,430,148 | 2/1969 | Miki | 318/85 |
| 3,718,845 | 2/1973 | Bejach et al. | 318/85 |
| 3,718,846 | 2/1973 | Bejach | 318/85 |
| 3,829,037 | 8/1974 | Sallin | 242/158 R |
| 3,876,166 | 4/1975 | Kadokura et al. | 242/158.4 R |
| 3,934,182 | 1/1976 | Donohoe et al. | 318/85 |
| 3,944,896 | 3/1976 | Rodek | 318/85 |
| 4,000,449 | 12/1976 | Gripp | 318/85 |
| 4,023,080 | 5/1977 | Tanimoto | 318/85 |
| 4,079,297 | 3/1978 | Norrell | 318/85 |
| 4,083,515 | 4/1978 | Dickerson | 242/158 R |

Primary Examiner—Fred L. Braun
Assistant Examiner—Richard M. Moose
Attorney, Agent, or Firm—J. B. Hoofnagle

[57] ABSTRACT

The operation of a first motor and a second motor generates first and second frequency signals, respectively, which are fed to a phase lock loop (59) for phase comparison. A tri-level detection circuit (61) develops an output signal in response to the phase relationship between the first and second frequency signals. The first frequency signal is converted to a voltage signal by a converter (63) which is fed to an amplifier (64). A feedback circuit (66) is connected across the amplifier and includes several selectable levels of impedance. A switching network (62) responds to the output signal of the detection circuit (61), and thereby in response to the phase relationship between the first and second frequency signals, to connect one of the impedance levels of the feedback circuit (66) across the amplifier circuit (64). The amplified voltage signal is fed to a controller within a motor drive (72) for the second motor to control the speed of the second motor and insure in-phase operation thereof with the first motor.

11 Claims, 13 Drawing Figures

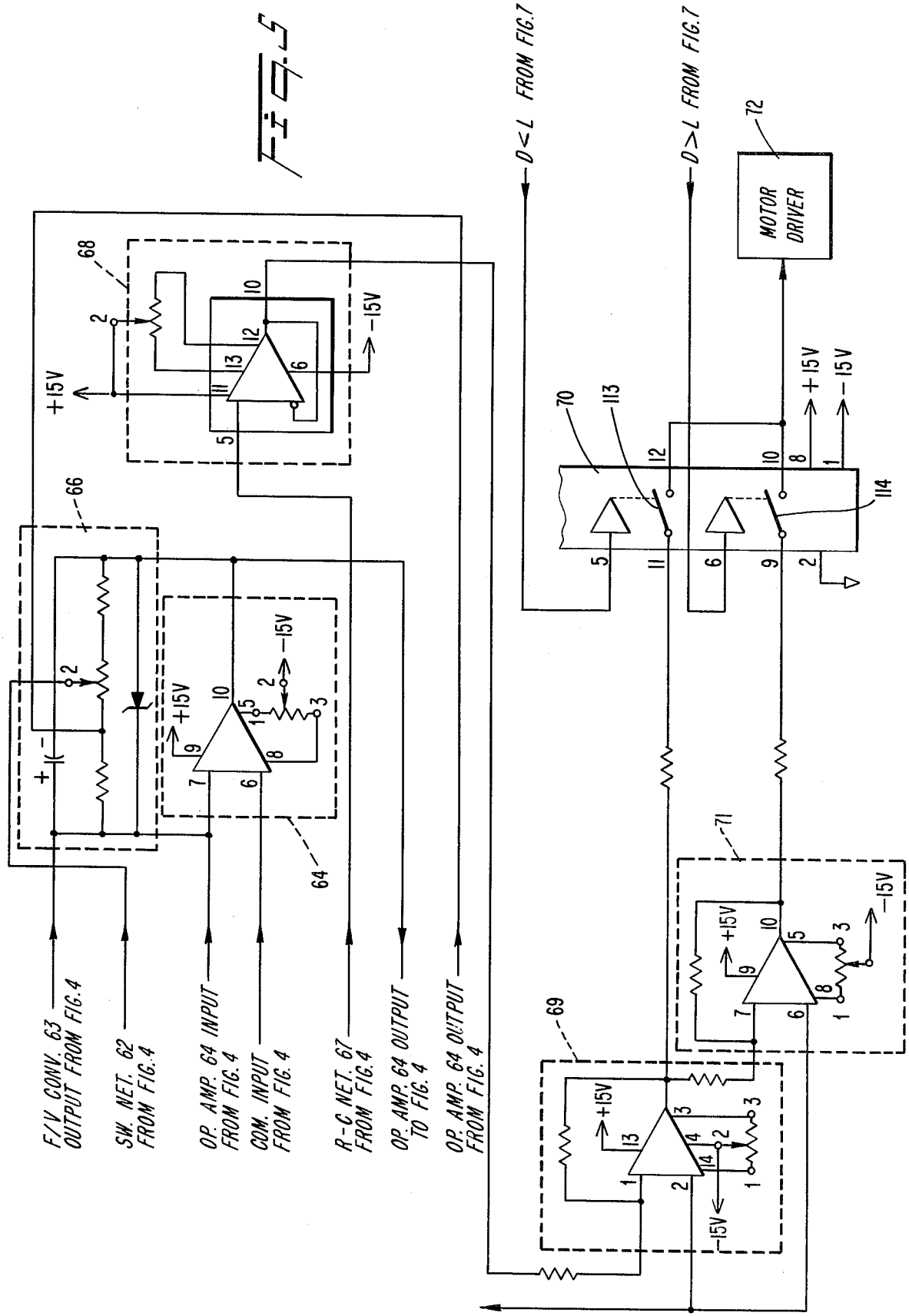

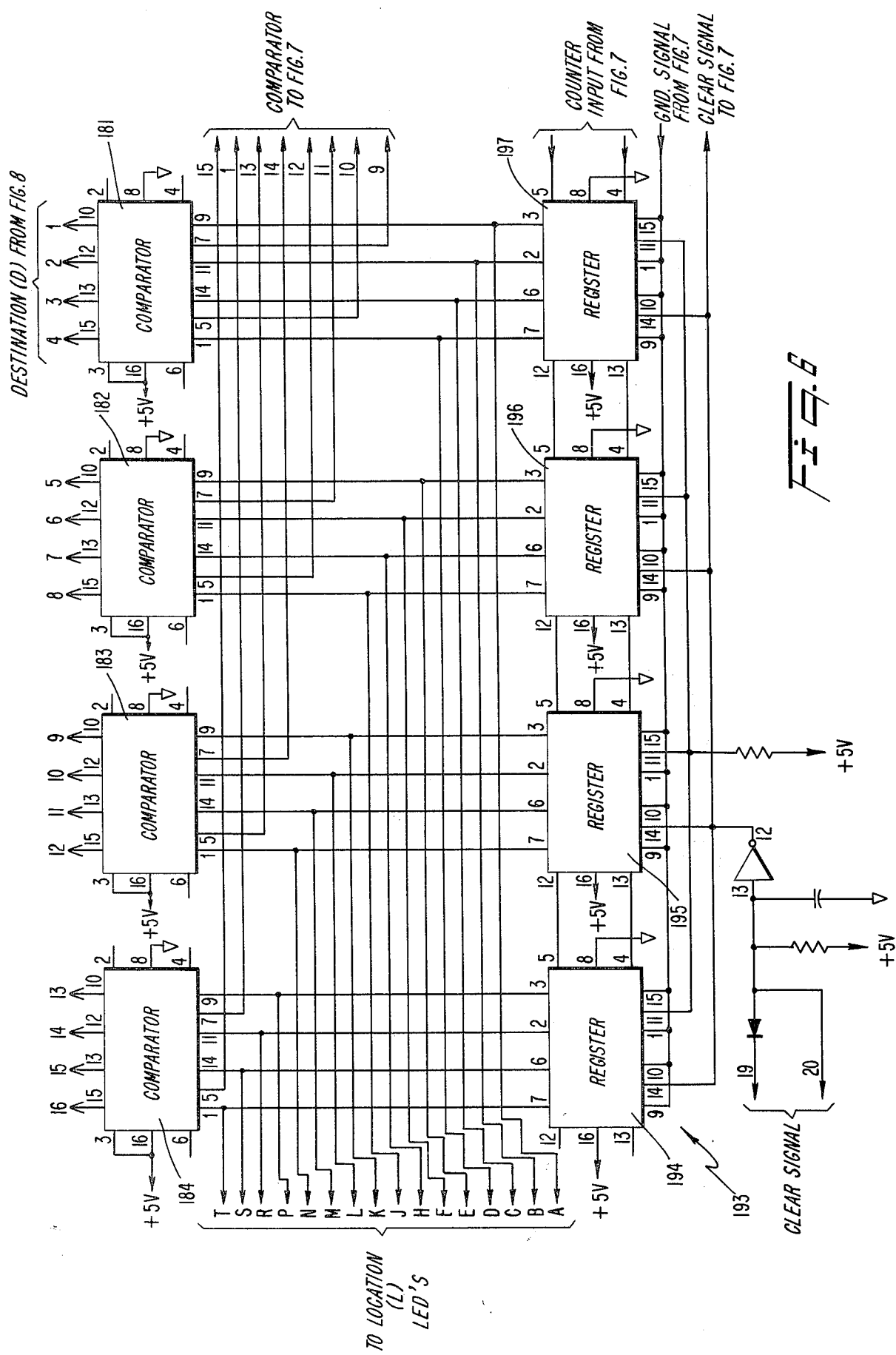

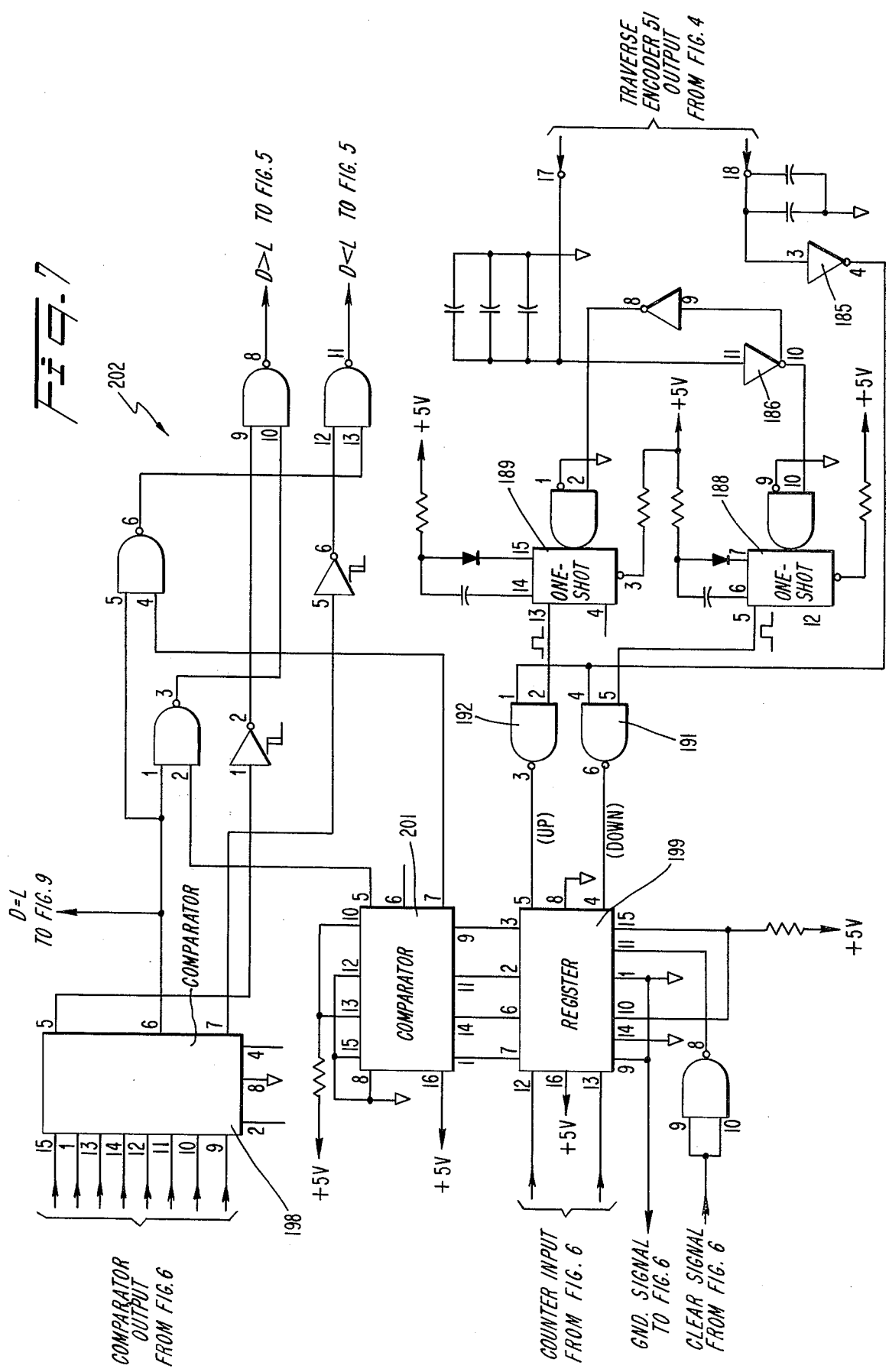

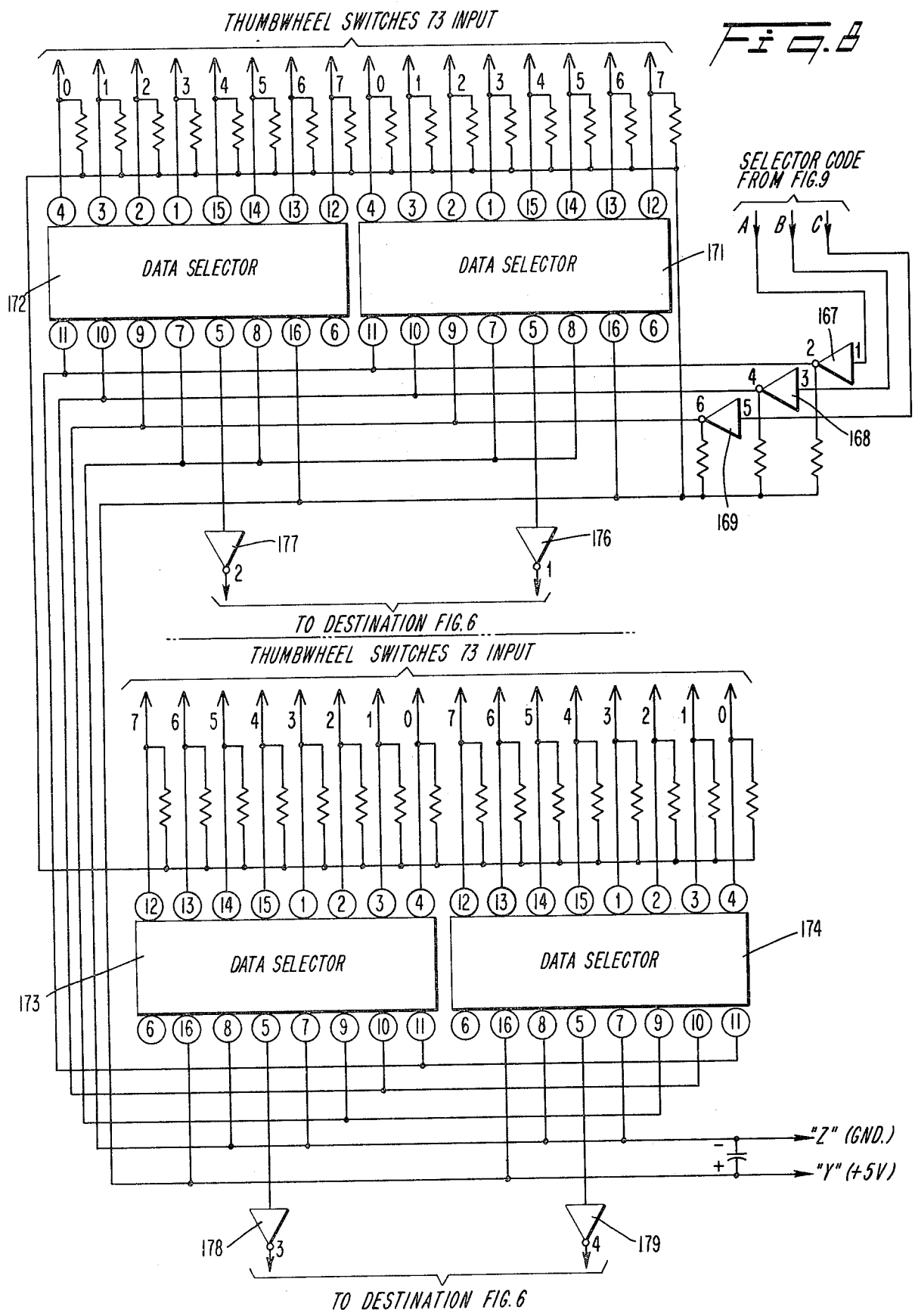

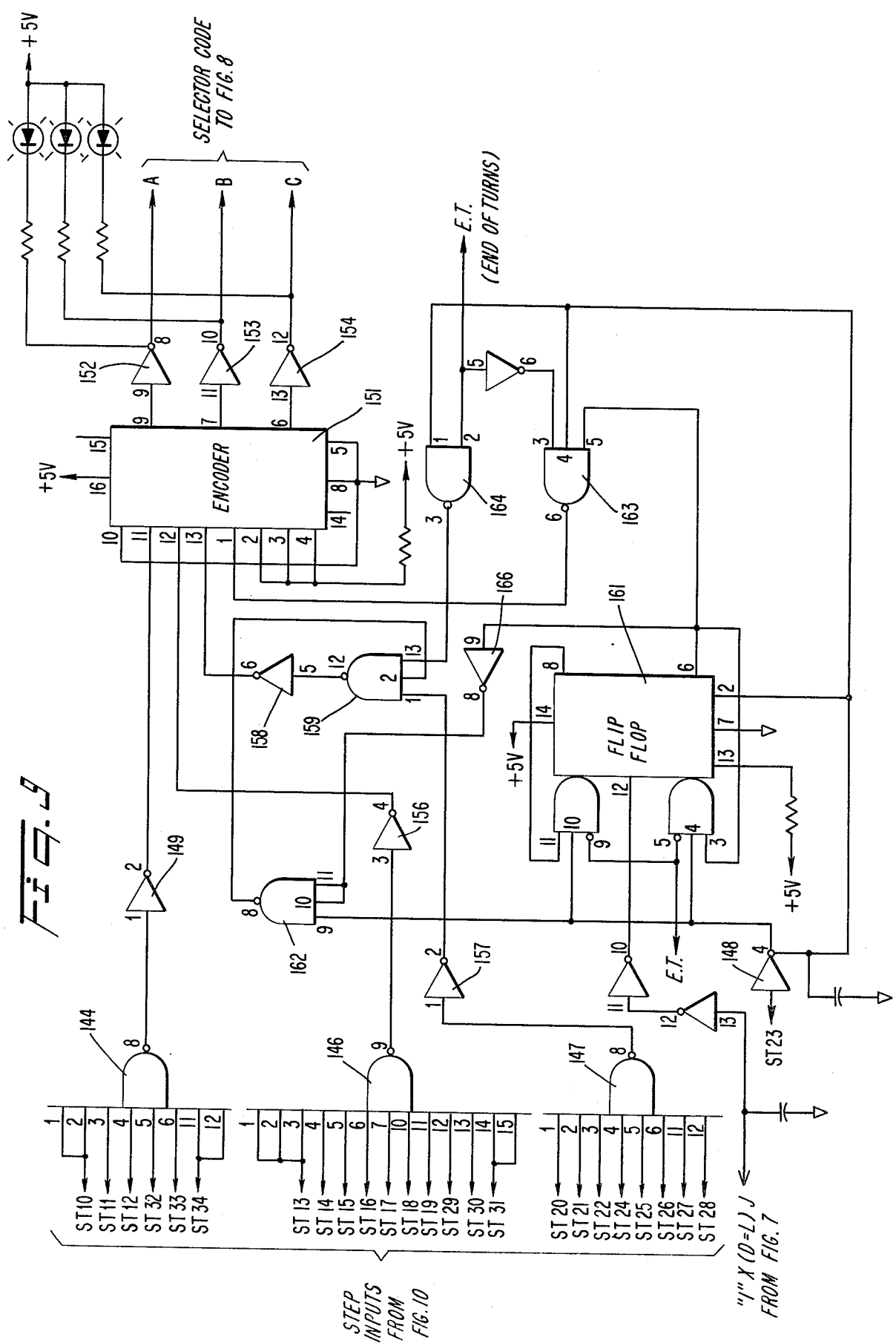

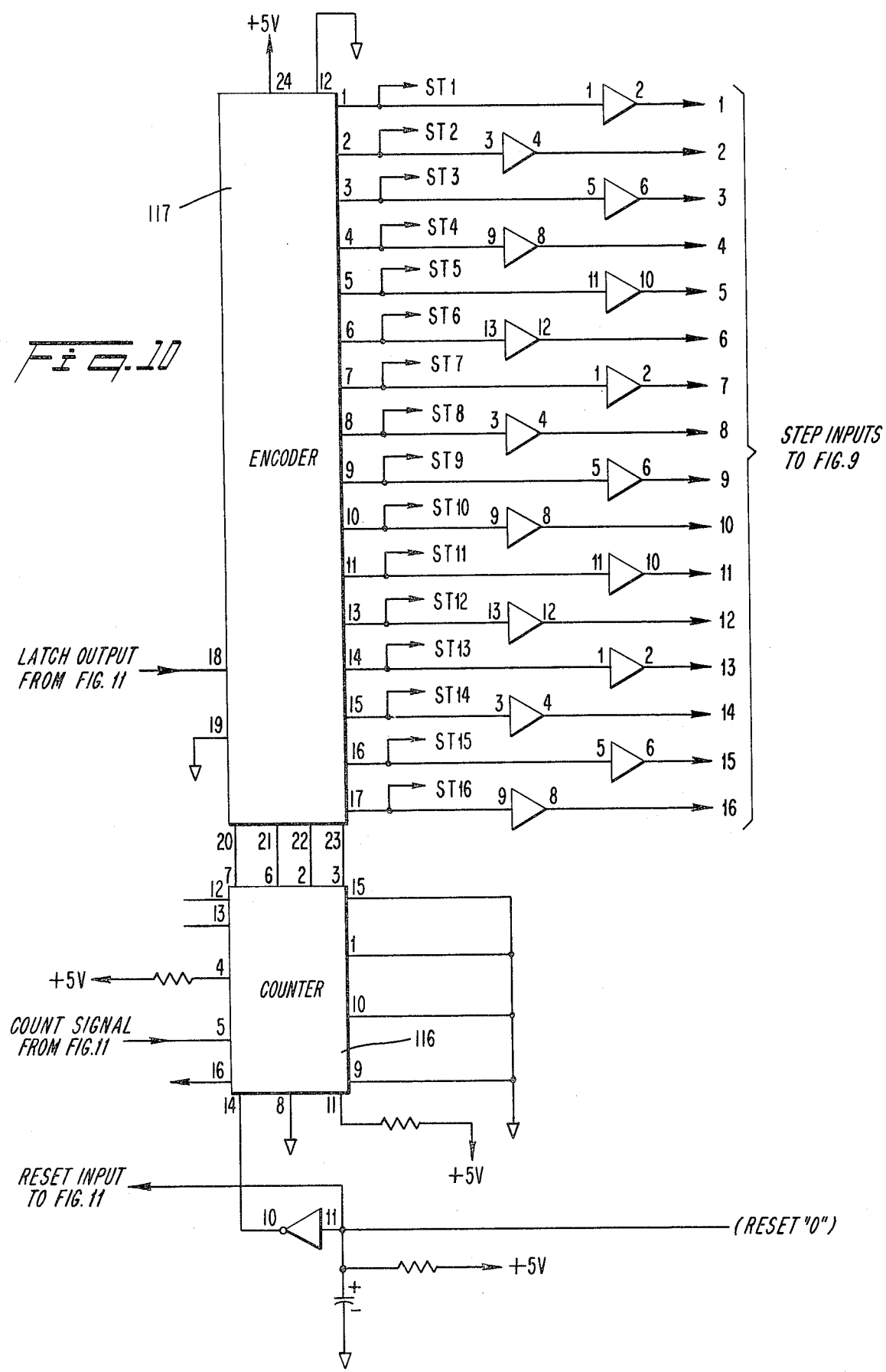

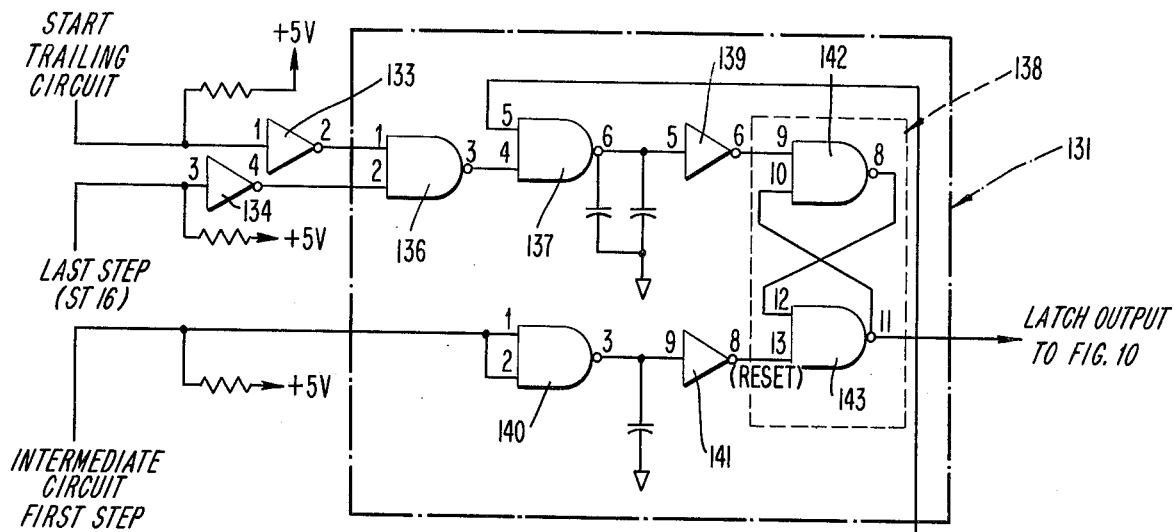
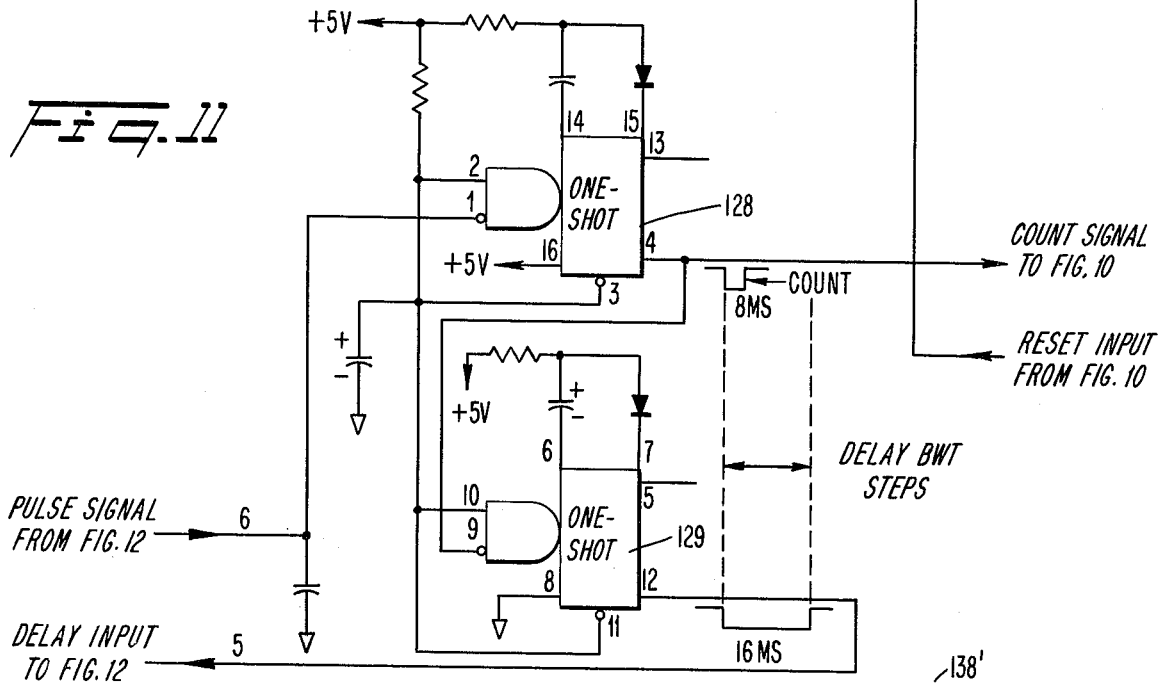
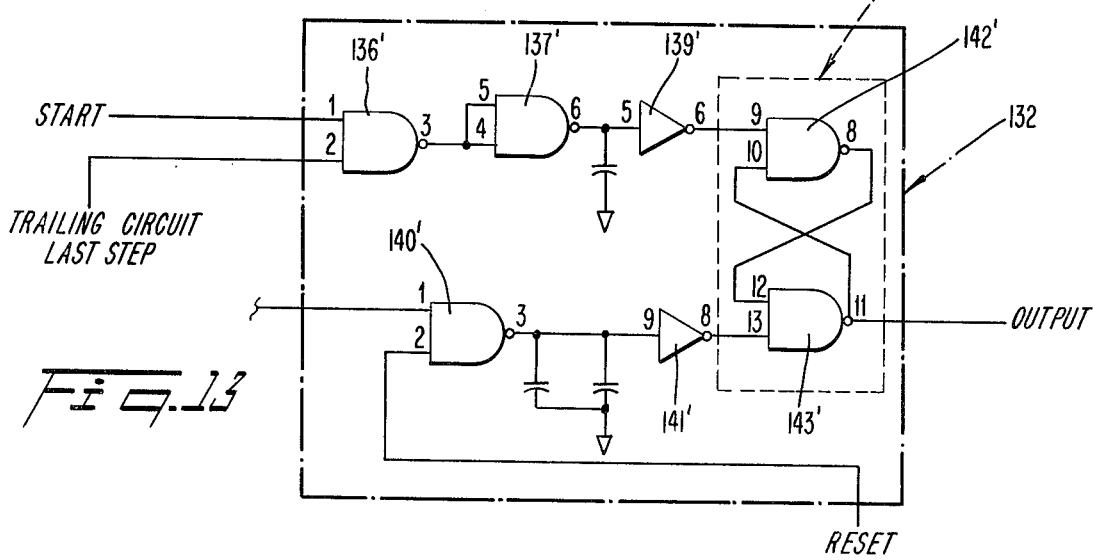

SYSTEM FOR CONTROLLING THE IN-PHASE OPERATION OF A PAIR OF MOTORS

TECHNICAL FIELD

This invention relates to a system for controlling the in-phase operation of a pair of motors. The invention relates particularly to a system for controlling the in-phase operation of a strand-guide traverse motor and a bobbin-rotating arbor motor used in a coil winding operation.

BACKGROUND OF THE INVENTION

In the winding of strand material onto bobbins, the material is typically wound onto the bobbins in layers containing successive convolutions of the strand material distributed uniformly between front and back flanges of the bobbin. Due to the small distance between the flanges of the bobbin, it is important to provide precise control of a traverse motor which drives the traversing mechanism.

In a prior system, a mechanical control of the traversing mechanism includes a drive motor which operates at a constant speed in only one direction. The system also includes a pair of parallel shafts driven through two bevel gears, two electrically operated friction clutches and a pair of meshing spur gears. A switch is located at each end of the path of travel of the traversing mechanism representative of reversal end-points. As a carriage which supports the traversing mechanism approaches one of the flanges of the bobbin, the carriage engages one of the switches. The reversing of the traversing mechanism is effected by alternately actuating one of the friction clutches as the appropriate switch is engaged by the carriage. A system as described above is disclosed in U.S. Pat. No. 3,314,452.

A mechanical system, such as the one described above, requires constant maintenance. Moreover, the length-of-travel of the traversing mechanism is fixed which prevents the winding of strand onto bobbins of various sizes.

Consequently, there exists a need for a system to control the movement of a traversing mechanism to provide for uniform distribution of strand being wound onto a bobbin and to facilitate a variable length-of-travel of the traversing mechanism.

SUMMARY OF THE INVENTION

This invention contemplates a system for controlling the in-phase operation of two motors used in a strand winding operation. The system includes means for driving each of the motors and further includes means for generating two frequency signals in response to the speed of the motors. Means are provided for comparing the phase relationship between the two frequency signals and for generating a control signal if the two frequency signals are out of phase. Additional means respond to the control signal to provide control for the driving means of one of the motors to where the speed of that motor is adjusted until the two frequency signals are in phase.

BRIEF DESCRIPTION OF THE DRAWINGS

FIGS. 2 through 13 are schematic diagrams of the control system of FIG. 1.

DETAILED DESCRIPTION OF THE INVENTION

An apparatus, of the type described in copending application Ser. No. 85,099, filed on Oct. 15, 1979 and assigned to the assignee of this application, for winding strand, such as wire, onto bobbins in the manufacture of a plurality of coils includes an arbor motor, a needle wire guide, a carriage and a traverse motor. Each of the motors has a dedicated tachometer fixedly attached thereto. The bobbins are attached to parallel spaced arbors which are driven by the arbor motor. The needle wire guide is attached to the carriage and is driven by the traverse motor. A detailed description of the mechanical operation of the apparatus is provided in the above-mentioned copending application which, by reference thereto, is incorporated herein.

Figure 1:
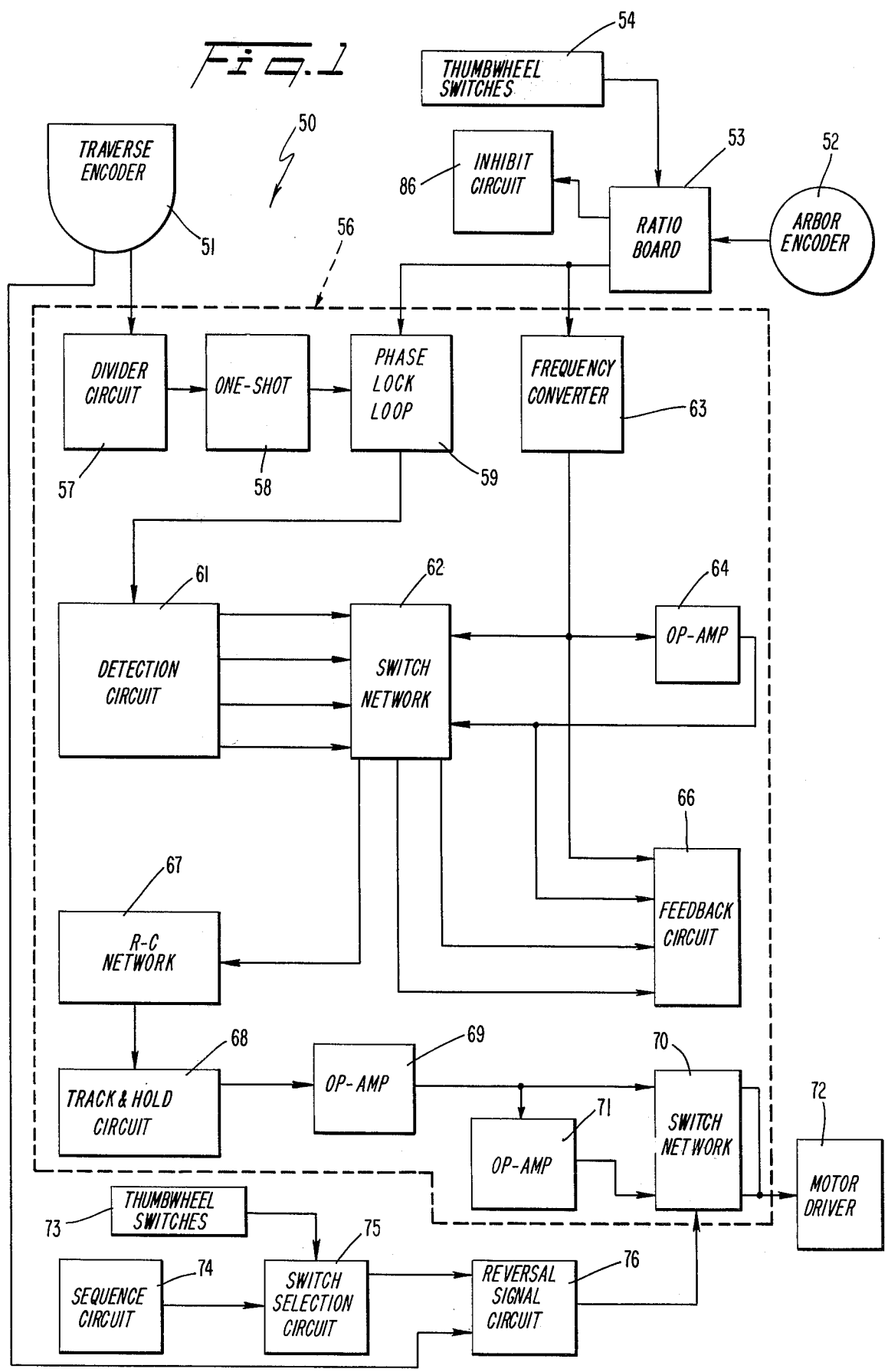
FIG. 1 is a block diagram of a control system in accordance with certain principles of the invention.

Referring to FIG. 1, there is illustrated a control system, designated generally by the numeral 50, for controlling the operation of the traverse motor of the above-mentioned apparatus. As noted above, the tachometer is attached to the traverse motor and generates a voltage signal which is proportional to the speed of the traverse motor. A traverse encoder 51 is fixedly attached to the tachometer to convert the generated voltage signal into a frequency signal.

In a similar manner, the tachometer which is attached to the above-mentioned arbor motor generates a voltage signal. This signal is fed to an arbor encoder 52. The tachometer and the arbor encoder 52 are fixedly attached to the arbor motor which operates at a fixed maximum speed.

The traverse motor, tachometer and the encoder 51 which performs in the foregoing manner is commercially available in a combined unit from the PMI Division of Kollmorgen Corporation of Syosset, New York and is identified as a Motor-Tachometer-Encoder Model U9M4H/U6/OT-2000.

The arbor motor, tachometer and encoder 52 which performs in the foregoing manner is commercially available from the PMI Division of Kollmorgen Corporation of Syosset, New York and is identified as a Motor Model MF-19 and a Tachometer-Encoder Model U9M4/2000.

The control system 50 is designed to provide a finitely controlled rate signal for the traverse motor at a selectable rate proportional to the speed of the arbor motor. A ratio board 53 modifies the frequency signal generated by the arbor encoder 52 according to a ratio selected by an operator and manually set on thumbwheel switches 54. The ratio set on the thumbwheel switches 54 is based upon the gauge of the strand being wound onto the bobbins. The thumbwheel switches 54 provide for the operator-initiated changing of the ratio without any mechanical adjustments to the apparatus. This feature enhances to the flexibility of the apparatus through the control system 50.

A phase synchronization system, designated generally by the numeral 56, receives the modified frequency from the ratio board 53 and the frequency signal generated by the traverse encoder 51. The phase synchronization system 56 includes an integrated circuit 57 which divides by ten the frequency generated by the traverse encoder 51. This division allows the ratio, selected by the thumbwheel switches 54, to be expressed in tenths. A one-shot multivibrator 58 receives the divided frequency signal from the integrated circuit 57 and creates a well-shaped pulse.

The integrated circuit 57 and the one-shot multivibrator 58 which performs in the foregoing manner are standard commercially available integrated circuits identified as type SN 74192 and type SN 74123, respectively.

A phase lock loop 59 compares the modified frequency signal, generated by the ratio board 53, with the signal generated by the one-shot multivibrator 58 for a phase difference. Depending on the phase difference of the two signals, the phase lock loop 59 generates a signal which is either (1) a logic zero, (2) a logic one or (3) an open. A tri-level detection circuit 61 receives the output signal generated by the phase lock loop 59. The tri-level detection circuit 61 determines which of the three output signals was generated by the phase lock loop 59 and facilitates the closing of selected switches in a switching network 62.

The phase lock loop 59 which performs in the foregoing manner is commercially available from RCA of Somerville, New Jersey and is identified as a Phase Lock Loop Model CD4046AE. The switching network 62 which performs in the foregoing manner is commercially available from Analog Devices, Inc. of Norwood, Massachusetts and is identified as a Switching Network Model AD7510K.

A frequency-to-voltage converter 63 receives the modified frequency signal, generated by the ratio board 53, and generates a voltage signal. The voltage signal becomes the input signal to an operational amplifier 64 and to an adjustable, balanced feedback circuit 66. The feedback circuit 66 contains four feedback loops including an anti-saturation loop which aid in decreasing the acquisition time of the operational amplifier 64. The feedback loops of the feedback circuit 66 are connected to contacts of the switching network 62. The tri-level detection circuit 61 closes selected switches in the switch network 62 in response to the output signal generated by the phase lock loop 59. The selection of the individual feedback loops controls the gain of the operational amplifier 64 by increasing or decreasing the voltage signal input to the operational amplifier or by passing an amplified output signal of the operational amplifier on to a R-C network 67. The R-C network 67 performs the function of a damper circuit thus smoothing out the amplified voltage signal produced by the operational amplifier 64. A track-and-hold circuit 68 receives the amplified voltage signal from the R-C network 67 and holds that voltage signal until there is a subsequent change in its input signal or when there is an open circuit in the switching network 62.

The frequency-to-voltage converter 63 which performs in the foregoing manner is commercially available from Teledyne Philbrick of Dedham, Massachusetts and is identified as Frequency-to-Voltage Converter Model 4714. The spread operational amplifier which perform in the foregoing manner is a standard commercially available integrated circuit identified as type SN 72747. The track-and-hold circuit 68 which operates in the foregoing manner is commercially available from National Semiconductor of Santa Clara, California and is identified as an Amplifier Model LM310.

A unity-gain operational amplifier 69 inverts the output signal from the track-and-hold circuit 68. The inverted signal is fed to a switching network 70 as a positive signal. The inverted signal from operational amplifier 69 is also fed to a second unity gain operational amplifier 71 to produce a negative signal. The negative signal is also fed to the switching network 70. The positive and negative signals become driving signals to a traverse motor driver 72 of the apparatus described in the above-mentioned copending application as selected switches are closed in the switching network 70. The positive and negative signals cause the traverse motor to operate alternately in opposite directions in a reciprocating manner. As previously mentioned, the traverse motor drives the carriage on which the needle wire guide is attached. Thus, by providing reciprocating control of the traverse motor, the needle wire guide is reciprocated as wire is being wound onto bobbins.

The switching of the positive or negative signals to the traverse motor driver 72 is facilitated by the closing of selected switches in the switching network 70 in response to generated reversal signals. During each machine cycle, a complete coil package is wound onto a bobbin. During the operation of the winding apparatus of the above-mentioned copending application, different inputs from selected thumbwheel switches 73 are needed to establish the reversal end points of the reciprocating needle wire guide which represent the front and back flanges of the bobbin. Thus, an apparatus sequence circuit, designated generally by the numeral 74, generates signals which are representative of each step in the machine cycle in response to actuation of limit switches (not shown) of the apparatus. A thumbwheel switch selection circuit, designated generally by the numeral 75, receives the signals and selects the proper thumbwheel switches 73 that are needed for that particular step in the machine cycle. A reversal signal generating circuit, designated generally by the numeral 76, determines the direction of rotation of the traverse motor by analyzing a phase relationship of two signals from the traverse encoder 51. The phase relationship of the two signals determines whether a counter contained within the reversal signal generating circuit 76 counts up or down. When the count of the counter equals the value in the selected thumbwheel switch, a signal is generated. This signal becomes an input to the switching network 70 to close the appropriate switch, select the positive or negative signal and thereby reverse the rotation of the traverse motor. As the machine cycle continues, thumbwheel switches 73 representing the other flange are connected and the coincidence of the count of the counter and the value in the selected thumbwheel switch facilitates the generation of another reversal signal to reverse the traverse motor to operate in the opposite direction.

Figure 2:
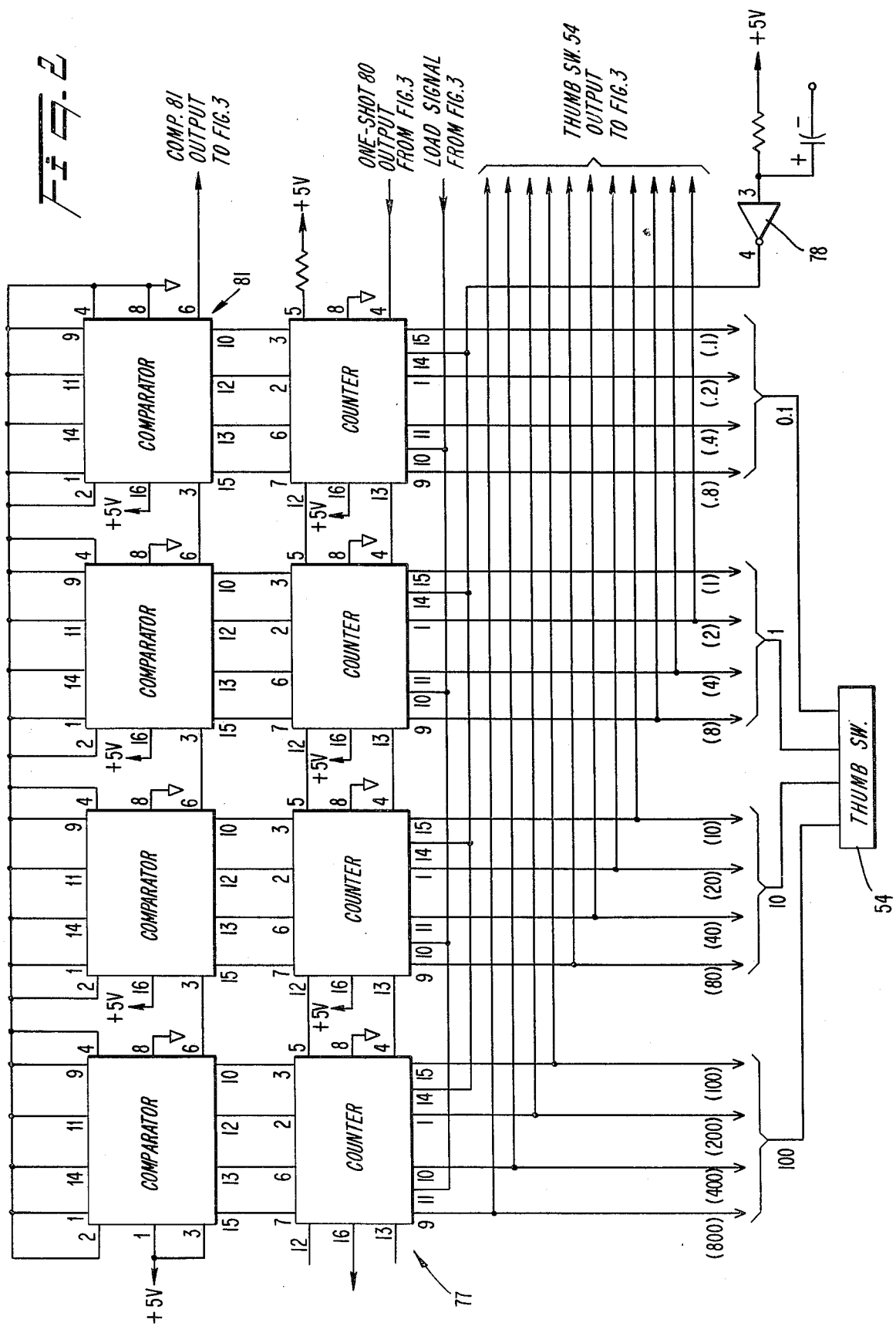
Figure 3:
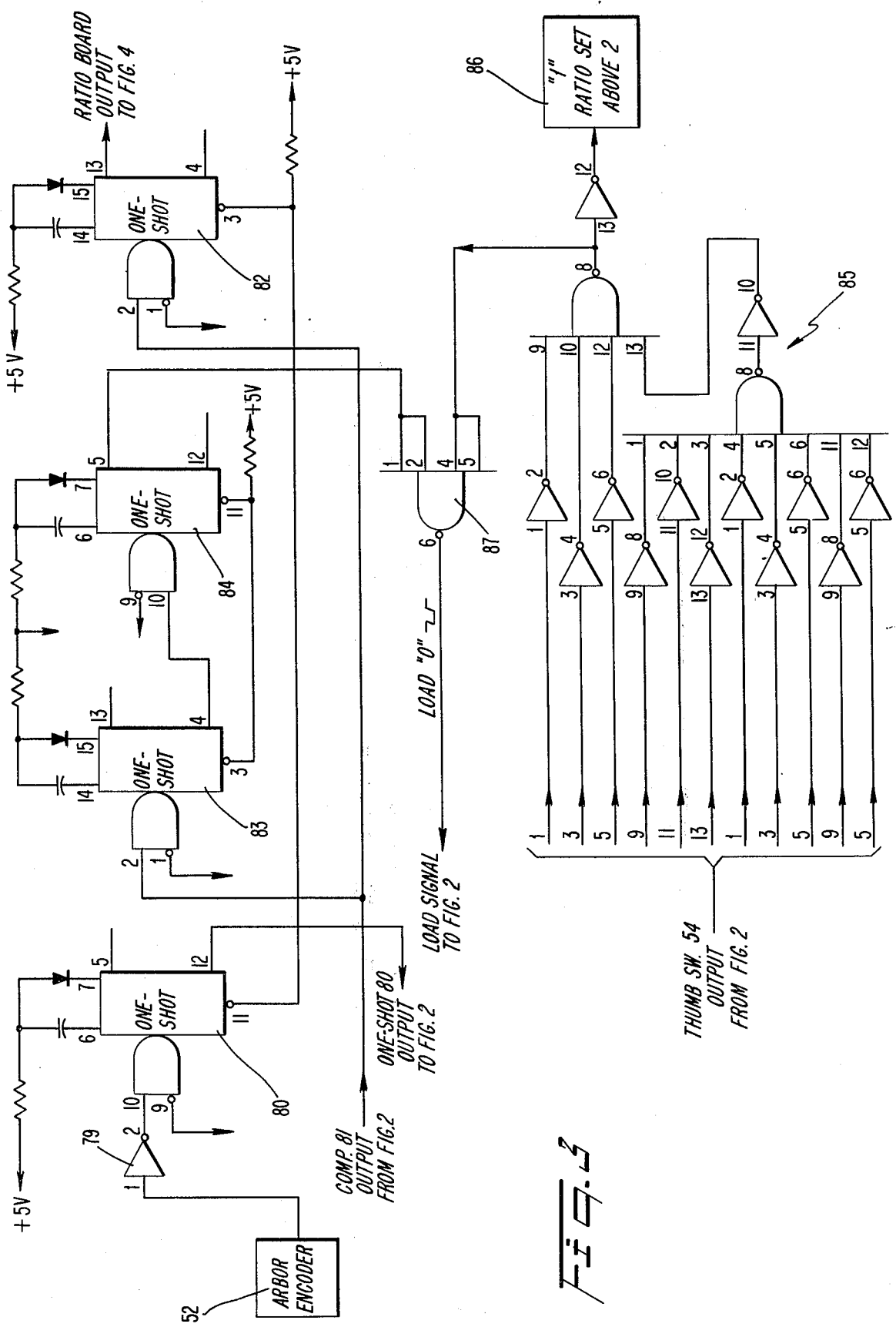

A detailed description of the ratio board 53 is illustrated in FIGS. 2 and 3. Ratios are established in the control system 50 through the settings of thumbwheel switches 54 and are loaded into a four-register counter, designated generally by numeral 77 (FIG. 2). A reset signal is fed through inverter 78 (FIG. 2) and resets all of the registers of the counter 77 when power is initially applied to the control system 50. The ratios are in the form of a four digit number and can be approximated as the ratio of the number of wire turns on each bobbin to the number of layers of wire. The number of layers of wire must be an even number.

The frequency signal from the arbor encoder 52 (FIG. 3) is inverted by an inverter 79 (FIG. 3) and then is fed to a one-shot multivibrator 80 (FIG. 3). The inverter 79 is of the Schmitt-trigger type and thus aids in the reduction of any noise which may be included with the frequency signal. The one-shot multivibrator 80 generates a signal of constant pulse width regardless of the frequency of the signal generated by the arbor encoder 52. The output of the one-shot multivibrator 80 is fed to the counter 77 which starts the registers of the counter in a count-down mode. The four registers of counter 77 are connected to four, two-input units of a comparator, designated generally by the numeral 81 (FIG. 2). The units of the comparator 81 are hard-wired such that the other input signal to each of the two-input units is zero. Thus the output signal from the one-shot multivibrator 80 facilitates the counting down to zero from the ratio that has been established by the thumbwheel switches 54. The comparator 81 generates an output signal when the value of the counter 77 coincides with the hard-wired input. The output signal from the comparator 81 then facilitates the generation of a modified frequency signal by a one-shot multivibrator 82 (FIG. 3) which represents the output of the ratio board 53.

The output signal from the comparator 81 also is coupled to a pair of series-connected one-shot multivibrators 83 and 84 (FIG. 3). One-shot multivibrators 83 and 84 generate a signal which aids in the reloading of the ratio from the thumbwheel switches 54 into the counter 77. The series connection of the one-shot multivibrators 83 and 84 generates a time delay before the start of the next counting sequence.

The ratio board 53 also has a provision which disables the control system 50 if there is an improper ratio on the thumbwheel switches 54. A disabling circuit, designated generally by the numeral 85 (FIG. 3), detects whether the ratio which is set by the thumbwheel switches 54 is greater or less than two. If the ratio is less than two, the circuit 85 generates a signal which becomes an input to a ready or inhibit circuit 86 (FIGS. 1 and 3) and prevents the control system 50 from operating. The inverted output of the circuit 85 is combined with the output from the series-connected one-shot multivibrators 83 and 84 and is fed to a NAND gate 87 which generates a load signal. The load signal is coupled to the registers of the counter 77 and facilitates the loading of the thumbwheel-set ratio into the counter.

The sequence of loading the ratio into the registers, counting, comparing and generating a ratio-board output signal continues until the ratio set on thumbwheel switches 54 is manually changed. The manual change of the ratio is made when there is a change in the gauge of the wire to be wound onto the bobbins.

The NAND gate 87, inverters 78 and 79, one-shot multivibrators 80, 82, 83 and 84, registers of counter 77 and units of comparator 81 are standard commercially available integrated circuits identified as types SN 7420, SN 7414, SN 74123, SN 74192 and SN 7485, respectively.

The inverters and NAND gates contained within the disabling circuit 86 are standard commercially available integrated circuits identified as types SN 7404, SN 7420 and SN 7430.

Figure 4:
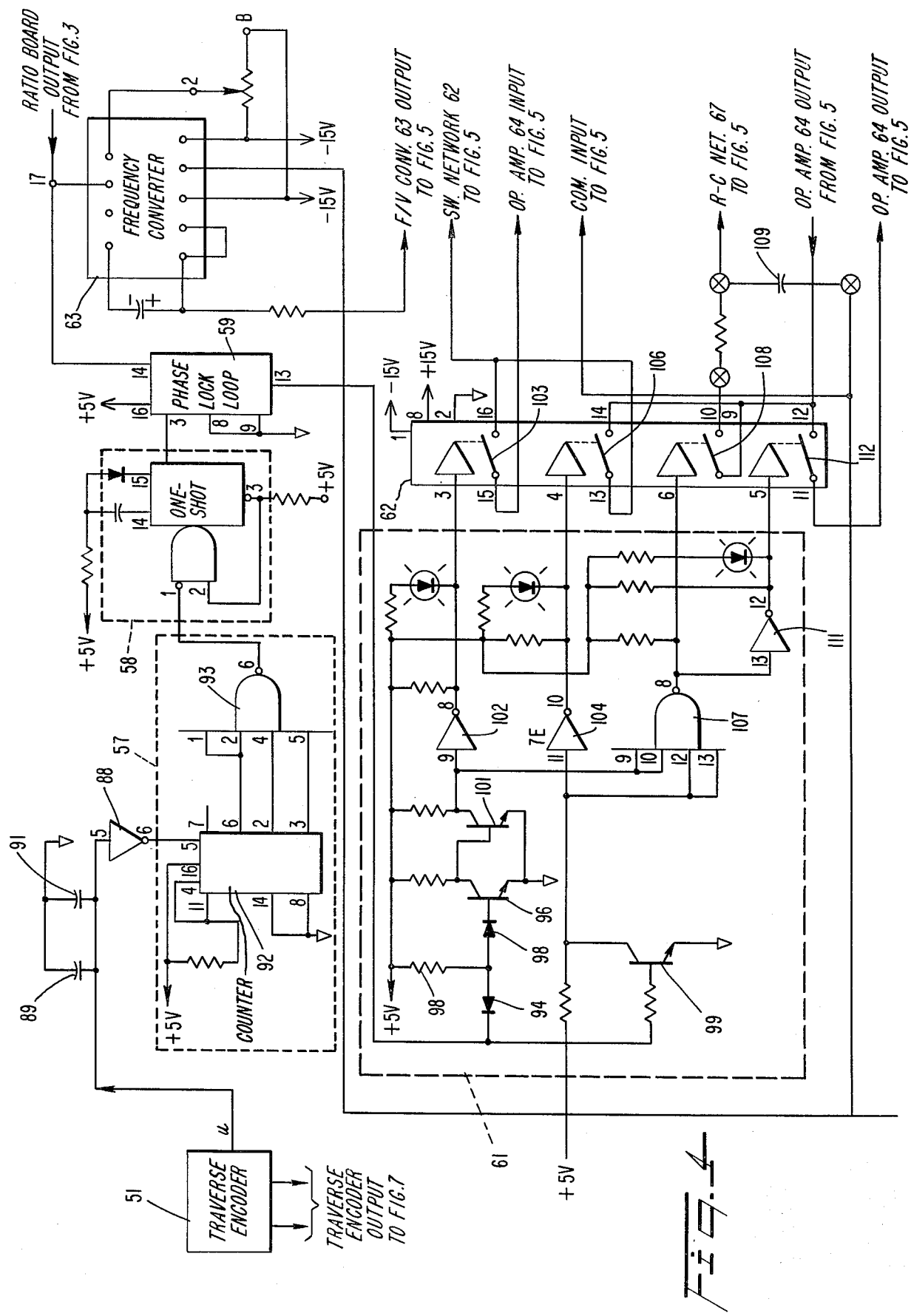

The phase synchronization system 56 is illustrated in FIGS. 4 and 5. Referring to FIG. 4, the frequency signal generated by the traverse encoder 51 is coupled to a Schmitt-trigger inverter 88 within the synchronization system 56. Capacitors 89 and 91 are included to aid in suppressing any noise which may be included with the frequency signal. The frequency-divider integrated circuit 57 includes a counter 92 and NAND gate 93. The counter 92 and the NAND gate 93 are connected to generate one pulse for every ten pulses received from the traverse encoder 51. Thus, the counter 92 and the NAND gate 93 functions as a divide-by-ten circuit. The division of the frequency signal generated by the traverse encoder 51 allows one of the digits of the ratio, set on thumbwheel switches 54 (FIGS. 1 and 2), to be expressed in tenths. The one-shot multivibrators 58 receives the divided frequency signal from the NAND gate 93 and generates a signal which has a constant pulse width regardless of the frequency of the divided frequency signal.

The phase lock loop 59 compares the modified frequency signal, generated by the ratio board 53, with the signal generated by the one-shot multivibrator 58 for a phase difference. Depending on the phase relationship of the two signals, the phase lock loop 59 generates either (1) a logic zero represented by a low signal, (2) a logical one represented by a high signal, or (3) a high impedance represented by an open. The tri-level detection circuit 61 detects which of the three possible outputs was generated. If the phase lock loop 59 generates a high signal, diode 94 in the tri-level detection circuit 61 is reverse biased. Transistor 96 is turned on by an input signal through resistor 97 and diode 98. A high signal from the phase lock loop 59 also turns on transistor 99. Transistor 101 is an inverter and effectively inverts the output signal of transistor 96. Thus, when transistor 96 turns on, the base of transistor 101 goes to ground and turns off transistor 101. The output signal of transistor 101 then goes high which is the inverse of the output signal of transistor 96.

If the phase lock loop 59 generates a low signal, diode 94 is forward biased and transistor 96 is off. Transistor 99 is off and transistor 101 is on. If the phase lock loop 59 generates a high impedance or open signal, transistor 99 is off while transistor 96 turns on because of the relatively high voltage level coupled through resistor 97 and diode 98 to the base of transistor 96. Since transistor 96 is on, transistor 101 is off. Thus, there are three logic-detectable signals with reference to transistors 96 and 99. The three detectable signals occur either when transistors 96 and 99 are (1) both on, (2) both off or (3) transistor 96 is on and transistor 99 is off.

The frequency-to-voltage converter 63 receives the modified frequency signal, generated by the ratio board 53, and converts it into a voltage signal. The voltage signal is fed to the input of the operational amplifier 64 and the balanced feedback circuit 66. The feedback circuit 66 contains four feedback loops which are connected to the contacts of the switching network 62. The operational amplifier 64 has a normal gain ratio of three-to-one. The selection of the individual feedback loops controls the gain of the operational amplifier 64 by modifying the amount of impedance in the feedback loops. The feedback loops of the feedback circuit 66 are connected to the contacts of the switching network 62.

The tri-level detection network 61 closes selected switches in the switching network 62 in response to the output signal generated by the phase lock loop 59 as a result of the occurrence of one of the aforementioned three conditions. In the first condition, the traverse motor is lagging in phase behind the arbor motor whereby the output signal of the phase lock loop 59 is high. This high signal causes transistors 96 and 99 to be turned on whereby transistor 101 is turned off. As previously mentioned, the output signal of transistor 101 is high when the transistor is off. The high output of transistor 101 is inverted thus creating a low signal which is fed to a control unit of a solid state switch 103 in the switching network 62. However, this low signal will not close switch 103.

As noted, transistor 99 is also turned on by the high signal from the phase lock loop 59. As transistor 99 turns on, its output signal goes low. The output of transistor 99 is connected through an inverter 104 to a control unit of a solid state switch 106 in the switching network 62. The inverter 104 inverts the low output signal of transistor 99 to a high signal which facilitates the closing of the switch 106. The closing of the switch 106 increases the impedance in the feedback network 66 thus increasing the gain ratio of the operational amplifier 64.

NAND gate 107 has inputs from the output of transistor 101 and the output of transistor 99. Since the output of transistor 101 is high and the output of transistor 99 is low, the output signal from the NAND gate 107 is high and is fed to a control unit of a solid state switch 108 in the switching network 62 to facilitate closing of the switch. The closing of switch 108 connects the R-C network 67 to the output of the operational amplifier 64. Capacitor 109 of network 67 is charged to the level of the amplified voltage appearing at the output of the operational amplifier 64.

The output signal of the NAND gate 107 is inverted by inverter 111 and fed to a control unit of a solid state switch 112 in the switching network 62. However, since the inverted output is low, switch 112 will not be closed at this time.

In the second condition, the traverse motor is leading in phase ahead of the arbor motor and the resultant output signal from the phase lock loop 59 is low. This low signal results in diode 94 being forward biased and diode 98 being reversed biased. This causes transistor 96 to turn off and its output goes high. The high output of transistor 96 turns on transistor 101. When transistor 101 turns on, its output goes low. The inverter 102 inverts the low output signal from transistor 101 to a high signal thus facilitating the closing of switch 103. The closing of the switch 103 decreases the impedance in the feedback network 66 thus reducing the gain ratio of the operational amplifier 64. In addition, the transistor 99 is turned off by the low signal from the phase lock loop 59. Therefore, the output of transistor 99 is high and, when inverted, will not close the switch 106.

The inputs to the NAND gate 107 is a low signal from the output of transistor 101 and a high signal from the output of transistor 99 thus producing a high output signal. The high output signal from the NAND gate 107 facilitates the closing of switch 108 thereby connecting the R-C network 67 to the output of the operational amplifier 64. Since the gain has been reduced, capacitor 109 discharges until the stored voltage equals the amplified voltage of the operational amplifier 64.

In the third condition, the traverse motor and the arbor motor are in phase and the output of the phase lock loop 59 is a high impedance which will hereinafter be referred to as an open. This causes diode 94 to be reversed biased. Transistor 96 is turned on by a signal through the resistor 97 and the diode 98. The output of transistor 96 goes low and turns off transistor 101. The output of transistor 101 is high and when inverted will not close the switch 103. The open output of the phase lock 59 causes the transistor 99 to turn off. The output signal of transistor 99 is high and when inverted will not close the switch 106.

The inputs to the NAND gate 107 are both high, thus its output signal is low and will not close switch 108. However, as noted above, the output of the NAND gate 107 is also connected to switch 112 through inverter 111. The inverted output signal from the NAND gate 107 is high and thus facilitates the closing of switch 111. The closing of the switch 112 establishes connections within the feedback network 66 to provide the normal three-to-one gain ratio. Therefore, since the traverse motor and the arbor motor are in phase, the stored voltage level of capacitor 109 is not changed.

As noted above, the R-C network 67 (FIG. 4) is connected to the track-and-hold circuit 68 (FIG. 5). The track-and-hold circuit 68 generates an output signal which is equivalent to the voltage across capacitor 109. The track-and-hold circuit 68 must be able to hold its output voltage constant especially when the output of the phase lock loop 59 is open. When the output of the phase lock loop 59 is open, switch 108 in the switching network 62 is open. Thus, the input to the R-C network 67 is an open circuit and the output signal of the track-and-hold circuit 68 is determined by the voltage across the capacitor 109.

The unity gain operational amplifier 69 inverts the output signal from the track-and-hold circuit 68. The inverted signal is fed to solid state switch 113 of the switching network 70 as a positive signal. The output signal from the operational amplifier 69 and the voltage signal from the frequency-to-voltage converter 63 are also fed to the second unity gain operational amplifier 71 to produce a negative signal. The negative signal is fed to solid state switch 114 of the switching network 70. The positive and negative signals developed through amplifiers 69 and 71, respectively, become driving signals which are applied to the traverse motor driver 72 as the switches are closed in response to generated reversal signals.

Figure 12:
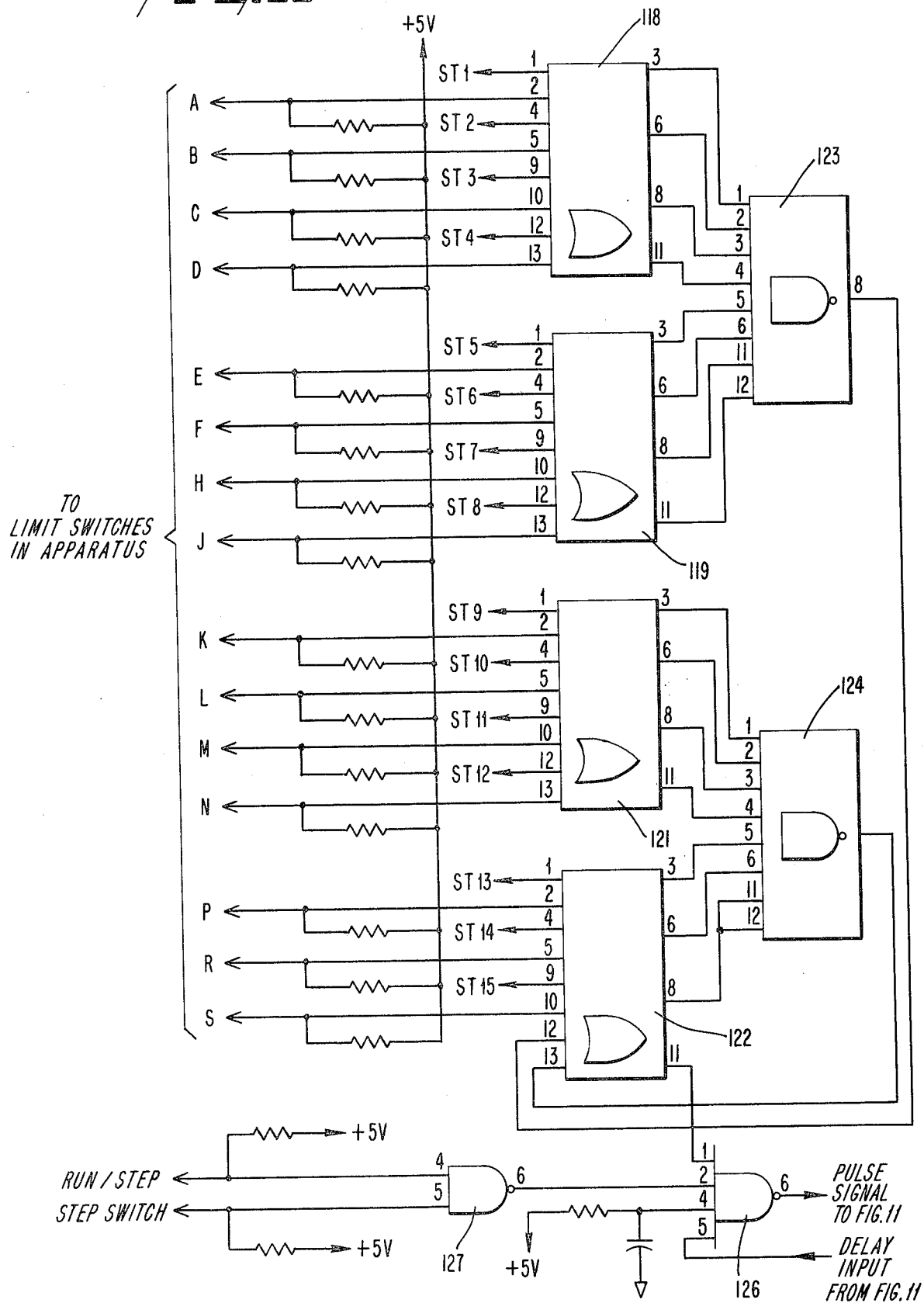

One third of the apparatus sequence circuit 74 is illustrated in FIGS. 10, 11 and 12. During each machine cycle, a complete coil package is wound onto a bobbin in a series of steps. In each step, the winding apparatus, described in the above-mentioned copending application, completes a single function or series of functions. Each of a plurality of limit switches (not shown) within the apparatus is associated with each step. Each limit switch within the apparatus is closed after all of the functions required by that step are completed. The closing of the limit switch indicates to the apparatus sequence circuit 74 to move to the next step.

The winding apparatus requires forty-eight steps to progress through a complete machine cycle. To accomplish a complete machine cycle, three circuits of the type of circuit illustrated in FIGS. 10, 11 and 12 are required. Each circuit provides sixteen steps for a total of forty-eight steps for the complete machine cycle. While the following description relates to the circuit illustrated in FIGS. 10, 11 and 12, it is to be understood that the two unillustrated circuits are identical except for minor differences to be described later.

Referring to FIG. 10, a four-bit counter 116 drives a four-to-sixteen line encoder 117. Each count from the counter 116 represents a step in the machine cycle of the winding apparatus. The output from the counter 116 facilitates the selection of one of sixteen output lines in the encoder 117 which has the same value as the count of counter 116. This selection causes the normally high output line to go to a low state. All other output lines remain high until the appropriate count is generated by the counter 116 to facilitate their output going to a low state. Each of a plurality of terminals ST1 through ST15, representing outputs of the encoder 117, is connected to correspondingly numbered input terminals ST1 through ST15, respectively, illustrated in FIG. 12. Each of a plurality of integrated circuits 118, 119, 121 and 122 (FIG. 12) includes four two-input OR gates (not shown) with each of the input terminals ST1 through ST15 (FIG. 12) connected to one input of an associated one of the OR gates. Each of the output lines of the encoder 117 is related to a step in the machine cycle. Therefore, each output line of the encoder 117 represents one of the machine cycle steps and is related to an associated one of the limit switches.

Referring further to FIG. 12, the other input of each of the two-input OR gates is connected to one of a plurality of the limit switches within the apparatus and associated with the appropriate steps of the encoder 117 (FIG. 10). Under normal conditions, both of the inputs to the OR gates are high and, therefore, the outputs of the OR gates are high. The outputs of the integrated circuits 118 and 119 are fed into a NAND gate 123. The output of the NAND gate 123 is high only when at least one of its inputs is low. The inputs to NAND gate 123 will always be high unless the limit switch, within the apparatus, for a particular step is closed and the associated output line of the encoder 117 (FIG. 10) is in a low state for that particular step. A five volt level is connected through a plurality of resistors to each of the input terminals of the OR gates to which one of the limit switches is also connected. Thus, the five volt level keeps the input of each OR gate high until the associated limit switch is activated. When the limit switch is activated, it shorts the terminal to a ground state. The shorting of the terminal permits the NAND gate 123 to provide a high output when the particular step associated with the just-activated limit switch is selected by the encoder 117. The integrated circuits 119 and 122 are connected in a like manner to NAND gate 124 and operate in the same manner.

The counter 116, encoder 117, integrated circuits 118, 119, 121, 122, NAND gate 123 and NAND gate 124 are standard commercially available integrated circuits identified as type SN 74193, SN 24154N, SN 7432N and SN 7430N, respectively.

The outputs of NAND gates 123 and 124 are fed to an OR gate in integrated circuit 122. The output of the OR gate is fed to a NAND gate 126. The winding apparatus has two modes of operation which include (1) a run mode where the winding apparatus automatically continues from one step to the other and (2) a step mode where the winding apparatus will not continue to the next step until a step switch (not shown) is depressed. Included on the front panel (not shown) of the winding apparatus are two switches which (1) select the run or the step mode and (2) permit manual control of the winding apparatus to continue to the next step. The output from these two switches are the inputs to NAND gate 127. The output of the NAND gate 127 is also connected to the input of NAND gate 126.

The output of the NAND gate 126 drives a one-shot multivibrator 128 (FIG. 11). The output signal of the one-shot multivibrator 128 is fed to the counter 116 (FIG. 10) and to a one-shot multivibrator 129 (FIG. 11). The output signal from the one-shot multivibrator 129 is fed back as an input to the NAND gate 126 (FIG. 12).

The generation of a count for a particular step and the closing of the appropriate limit switch within the apparatus for that step causes the output of NAND gate 126 to go low. A low signal on the output of NAND gate 126 (FIG. 12) facilitates the generation of an output pulse by the one-shot multivibrator 128 (FIG. 11). The output of the multivibrator 128 causes the counter 116 (FIG. 10) to increase by one count. The output of the multivibrator 128 is also fed to the multivibrator 129. The output of the multivibrator 129 is fed back to the NAND gate 126 (FIG. 12) after a sixteen millisecond delay. The delay permits all of the circuits contained in the apparatus sequence circuit 74 to settle due to the change in the step.

As described above, one of the three circuits is illustrated in FIGS. 10, 11 and 12 and includes a latching circuit 131. The remaining two circuits (not shown) are substantially identical to the above-described circuit illustrated in FIGS. 10, 11 and 12 and provide the remaining two-thirds of the apparatus sequence circuit 74. As noted, the three circuits are substantially identical with minor differences between the latching circuit 131 of FIG. 11, which is a portion of the illustrated circuit of FIGS. 10, 11 and 12, and a latching circuit 132 (FIG. 13) used with the two circuits which are not illustrated. For purposes of the following description of the minor differences between the three circuits, the three circuits will be referred to as the leading circuit, the intermediate circuit and the trailing circuit with the leading circuit being illustrated in FIGS. 10, 11 and 12.

In operation, the three circuits are sequenced through forty-eight steps to provide for a complete machine cycle. The latching circuit 131 receives inputs from the last step of the trailing circuit, the first step of the intermediate circuit, an input from the start switch (not shown) on the front panel of the winding apparatus and an input from the reset switch (not shown) also on the front panel of the winding apparatus. Each of the latching circuits 131 and 132 is connected to the appropriate encoders 117 in each of the three sequence circuits. If the output of any of the latching circuits 131 and 132 is high, all of the outputs of the associated encoders 117 connected thereto are high. Thus, the latching circuits 131 and 132 activate the proper sequence circuit. For purposes of discussion, assume that the winding apparatus is in step forty-eight and is operating in the run mode. The step signal forty-eight is generated by the last step of the trailing circuit.

At that time, the latching circuits 131 and 132 of the leading and intermediate circuits provide high outputs which are coupled to the respective encoders 117. This holds the encoder outputs in a high state regardless of the inputs from the associated counters 116.

As previously mentioned, all of the step outputs are normally high and only the present step, step forty-eight in the machine cycle, is low. Referring to FIG. 11, the start signal is a low signal and is inverted by inverter 133. The last step, step forty-eight, of the trailing circuit, is inverted by inverter 134. NAND gate 136 receives inputs from inverters 133 and 134. The output signal of the NAND gate 136 is fed to NAND gate 137. The NAND gate 137 also receives an input from the reset switch. The output signal of the NAND gate 137 is fed through an inverter 138 to a flip flop designated generally by the numeral 139. The first step of the intermediate circuit is connected to both of the inputs of NAND gate 140. The output signal of the NAND gate 140 is fed through inverter 141 to the flip flop 139.

Since it has been assumed that the winding apparatus is in step forty-eight, the output of step forty-eight is low, thus the leading circuit is not activated and the output of the lead latching circuit 131 is high. The reset signal automatically goes low at the end of step forty-eight since the apparatus is operating in the run mode.

The inputs to the NAND gate 136 are high thereby producing a low output. The low output signal of the NAND gate 136 along with the low reset signal is fed to the NAND gate 137 thereby developing a high output signal. The high output signal of the NAND gate 137 is inverted by the inverter 138. The low output signal from the inverter 138 together with the high signal from the output of the latching circuit 131 causes the output of NAND gate 142 of the flip flop 139 to go high. The high output of the NAND gate 142 is fed to an input of NAND gate 143 of the flip flop 139. The other input to NAND gate 143 is also high since the input from the intermediate circuit is high. The double inversion of the input signal from the intermediate circuit by the NAND gate 140 and the inverter 141, does not change the input of the NAND gate 143. The output of the NAND gate 143 goes low thus activating the lead circuit.

Latching circuits, such as the latching circuit 132 illustrated in FIG. 13, activates the intermediate and the trailing circuits. The latching circuits 131 and 132 are similar except in the leading circuit, the reset signal enters the latching circuit 131 as an input to the NAND gate 137. The reset signal enters the latching circuit 132 as an input to a NAND gate 140'.

The thumbwheel switch selection circuit 75 is illustrated in FIGS. 8 and 9. As the wire guides (not shown) of the apparatus described in the above-mentioned co-pending application traverses across the bobbin during the winding of the coil, the thumbwheel switches representing the front and back flanges of the bobbin must be alternately switched into the reversal signal generating circuit 76 (FIG. 6). Selected step outputs from the apparatus sequence circuit 74 (FIG. 10) enter the thumbwheel switch selection circuit 75 as inputs to NAND gates 144, 146, 147 and inverter 148. The NAND gate 144 is connected through an inverter 149 to an eight line-to-three line encoder 151. The encoder 151 generates a three-digit binary output code of a 110 whenever any of the input signals of the encoder are inverted by inverters 152, 153 and 154. Therefore, the inverters 152, 153 and 154 produce a binary output code of 001. The NAND gate 146 is connected through an inverter 156 to the encoder 151. The encoder 151 generates a binary output code of 101 whenever any of the input signals connected to the NAND gate 146 goes low. The encoder 151 output signals are inverted thereby producing a binary output code of 010. The NAND gate 147 is connected through inverters 157 and 158 and NAND gate 159 to the encoder 151. The encoder 151 generates a binary output code of 100 whenever the signal from the inverter 158 goes low. The encoder 151 output signals are inverted producing a binary output code of 011. Output terminal ST23 from the apparatus sequence circuit 74, is connected to an inverter 148. The output of the inverter 148 is connected to both of the inputs of a flip flop 161 and to NAND gates 162, 163 and 164. The output of the flip flop 161 is connected to the NAND gates 163 and through an inverter 166 to NAND gate 162. Whenever the output of the NAND gate 163 goes low, the encoder 151 generates a binary output code of 011. The encoder 151 outputs are inverted producing a binary output code of 100. Whenever the flip flop 161 is clocked, its output signal alternately changes from a low to a high. The output of the flip flop 161 affects the outputs of the inverter 158 and the NAND gate 163. Therefore, when the flip flop 161 is clocked, the binary output code alternately changes from 011 to 100. Whenever all of the outputs from the inverters 149, 156, 158 or the NAND gate 163 are high, the encoder 151 generates a binary output code of 111 which, when inverted, produces a 000 binary output code.

The output of the inverters 152, 153 and 154 are connected to buffer drivers 167, 168 and 169 (FIG. 8). The drivers 167, 168 and 179 are connected to data selectors 171, 172, 173 and 174 through data select lines. Thumbwheel switches 73 are connected to the inputs of data selectors 171, 172, 173 and 174. Each of the thumbwheel switches 73 is a four-bit binary coded decimal type of switch. Thus, there are sixteen outputs from each of the thumbwheel switches 73. Each of the thumbwheel switches 73 has one output connected to an input of each of the data selectors 171, 172, 173 and 174. Thus twelve additional data selectors (not shown) are also included in the thumbwheel selection circuit 75.

The output code from the drivers 167, 168 and 169, selects the input line. As the lines are selected, the signals on the selected input lines are fed through the selectors 171, 172, 173 and 174 to their respective output lines. For purposes of discussion, if the binary output code from the drivers 167, 168 and 169 is 000, the signal on line 0 becomes the output of the appropriate data selector. The output of the data selectors 171, 172, 173 and 174 represents the four least significant digits of the selected one of the thumbwheel switches 73.

The outputs of the data selectors 171, 172, 173 and 174 are inverted by inverters 176, 177, 178 and 179. The output of the inverters 176, 177, 178 and 179 are connected to comparator 181 of the reversal signal generating circuit 76 (FIG. 6).

Referring to FIG. 6, the output from the other twelve data selectors (not shown) connects to comparators 182, 183 and 184 with the four most significant digits of the selected one of the thumbwheel switches 73 connected to the comparator 184.

Referring to FIG. 7, the outputs, channel A and channel B, of the traverse encoder 51 are connected to inverters 185 and 186, respectively. The output signals from channels A and B of the encoder 51 are shifted in phase by ninety degrees. When the traverse motor is rotating in a clockwise direction one channel leads the other by 90° and when the motor reverses and rotates in the counter-clockwise direction the other channel leads by 90°. The inverter 186 is connected to an inverter 187 and a one-shot multivibrator 188. The inverter 187 is connected to a one-shot multivibrator 189. The one-shot multivibrator 189 will generate a pulse when the signal from channel B of the encoder 51 goes high. The one-shot multivibrator 188 generates a pulse when the signal from channel B of the encoder 51 goes low. The output of the inverter 185, which is the inverted signal from channel A of the encoder 51, is connected to NAND gates 191 and 192. The NAND gates 191 and 192 are connected to a counter designated generally by the numeral 193 (FIGS. 6 and 7). The counters 193 will only count when the signal from channel A is low. Since the output from channel A is inverted by the inverter 185, a high signal is fed to NAND gates 191 and 192. Thus, when the output of the one-shot multivibrators 188 or 189 is high, the output of one of the NAND gates 191 or 192 goes low which causes the counter 93 to count up or down. If channel A leads channel B, the counter 93 counts up, and if channel B leads channel A, the counters 93 counts down. The output of registers 194, 195, 196 and 197 (FIG. 6) are connected to the input of the comparators 184, 183, 182 and 181 (FIG. 6), respectively. An output signal is generated by the comparators 181, 182, 183 and 184 when a coincidence of the count of the registers 194, 195, 196 and 197, hereafter referred to as the location, and the inputs from the thumbwheel selection circuit 75 (FIG. 8) hereafter referred to as the "destination," occur. The output signals from the comparators 181, 182, 183 and 184 are fed to comparator 198 (FIG. 7). The comparator 198 generates three output signals: (1) the destination is less than the location, (2) the destination is equal to the location and (3) the destination is greater than the location. The output signal of register 199 of the counter 193 is fed to comparator 201. The other inputs to the comparator 201 are wired to a code of five. The comparator 201 generates a signal when the count from the register is greater than five or less than five. Since the register 199 is not compared with the destination, the comparison by the comparator 201 increases the resolution.

The output from the comparators 201 and 198 are inputs to a logic circuit, designated generally by numeral 201, to generate the appropriate reversal signal. The reversal signals from the logic circuit 202 are connected to the phase synchronization system 56 (FIG. 5).

During the winding of wire onto bobbins, the wire guide (not shown) of the apparatus operates in a reciprocating manner between the flanges of the bobbins. The reversal signal generating circuit 76 generates a reversal signal whenever the location is equal to the destination. The location represents the instantaneous position of the needle wire guide and the destination generally represents the front and back flanges of the bobbin. Once a reversal signal has been generated by the circuit 76, the destination is changed by the thumbwheel switch selection circuit 75 which brings in a new destination representing the opposite flange of the bobbin.

The reversal signal generated by the circuit 75 (FIGS. 6 and 7) facilitates the closing of either switch 113 and 114 (FIG. 5). The closing of the switch 113 or 114 switches in a voltage signal of the opposite polarity. For purposes of discussion, assume the input signal to a motor controller within the traverse motor driver 72 (FIG. 5) is the positive voltage signal and a reversal signal is generated by the logic circuit 202 (FIG. 7). The reversal signal closes the switch 114 and opens the switch 113. The input signal to the motor controller within the traverse motor drive 72 is now a negative signal which slows the speed of the traverse motor while the motor continues to operate in the same direction. The motor controller is of the type which is commercially available from Control Research Systems, Inc. of Pittsburgh, Pennsylvania as their Model NC101. The phase lock loop 59 detects an out-of-phase condition as the speed of the traverse motor declines. Thus, the tri-level detector circuit 61, in response to the output signal from the phase lock loop 59, facilitates the increasing of the gain of the operational amplifier 64. The increased gain of the operational amplifier 64 increases the voltage signal being fed to the motor controller within the traverse motor driver 72. Since this amplifier voltage is a negative signal which is attempting to cause the traverse motor to be driven in the opposite direction, the speed of the traverse motor declines rapidly. Eventually, the forward inertia of the traverse motor is overcome and the operation of the motor is reversed. At this time, the voltage signal being fed to the motor controller in the traverse motor driver 72 is very high. The high voltage causes the traverse motor to increase in speed at a very rapid rate. As the traverse motor becomes in phase with the arbor motor, the phase lock loop 59 generates appropriate signals to the tri-level detector circuit 61 to modify the gain of the amplifier.

What is claimed is:

1. A system for controlling the in-phase operation of two motors, which comprises:

means for generating a first frequency signal in response to the speed of the first motor;

means for generating a second frequency signal in response to the speed of the second motor;

means responsive to the generation of the first frequency signal for developing a voltage signal at a voltage level representative of the speed of the first motor;

means for comparing the phase relationship between the first and second frequency signals and for developing a phase relationship signal indicative of the phase relationship between the first and second frequency signals;

means for selectively establishing different amplification levels for the voltage signals;

means, responsive to the phase relationship signal, for adjusting the voltage signal to one of the amplification levels required to control and facilitate the adjustment of the speed of the second motor until the first and second frequency signals are in phase;

means for controlling the speed of the second motor; and means for feeding the voltage signal from the adjusting means to the controlling means of the second motor to adjust the speed of the second motor until the first and second frequencies are in phase.

2. The system as set forth in claim 1 wherein the voltage signal adjusting means includes an amplifier for adjusting the level of the voltage signal.

3. The system as set forth in claim 2 which further comprises an impedance feedback circuit connected between the input and output of the amplifier having a plurality of selectable impedance levels for establishing different amplification levels of operation for the amplifier.

4. The system as set forth in claim 3 wherein the voltage signal adjusting means further includes means, responsive to any one of a plurality of outputs of the comparing means representative of any one of a corresponding plurality of different phase relationships between the first and second frequency signals, for selecting one of the impedance levels of the feedback circuit.

5. A system for controlling the in-phase operation of two motors, which comprises:

means for generating a first frequency signal in response to the speed of the first motor;

means for generating a second frequency signal in response to the speed of the second motor;

means responsive to the generation of the first frequency signal for developing a voltage signal at a voltage level representative of the speed of the first motor;

means for comparing the phase relationship between the first and second frequency signals and for developing a phase relationship signal indicative of the phase relationship between the first and second frequency signals;

means, responsive to the phase relationship, for adjusting the voltage signal to a level required to control and facilitate the adjustment of the speed of the second motor until the first and second frequency signals are in phase;

means for controlling the speed of the second motor;

means for feeding the voltage signal from the adjusting means to the controlling means of the second motor to adjust the speed of the second motor until the first and second frequencies are in phase;

means responsive to the development of the voltage signal for generating a positive voltage signal and a negative voltage signal; and means for selectively applying the positive and negative voltage signals to the controlling means to facilitate selective operation of the second motor in opposite directions.

6. The system as set forth in claim 5, which further comprises:

means for selecting periodic intervals to reverse the direction of the second motor;

means for generating a reversal signal when each periodic interval is attained; and means for feeding the reversal signal to the applying means to selectively operate the second motor in the reverse direction.

7. A system for controlling the in-phase operation of two motors, which comprises:

means for generating a first frequency signal in response to the speed of the first motor;

means for generating a second frequency signal in response to the speed of the second motor;

means responsive to the generation of the first frequency signal for developing a voltage signal at a voltage level representative of the speed of the first motor;

means for controlling the speed of the second motor;

means for feeding the voltage signal to the controlling means to facilitate the operation of the second motor at a speed responsive to the level of the voltage signal;

means for generating a second reversal signal for the second motor at a selected time after the second motor has operated in a first direction;

means responsive to the application of the reversal signal to the controlling means for applying the voltage signal to the controlling means to operate the second motor in a second direction where, due to inertia, the second motor continues to operate in the first direction at declining speeds;

means for comparing the phase relationship between the first and second frequency signals and for developing an out-of-phase signal when the second motor operates at the declining speeds to indicate that the first and second frequency signals are not in phase; and means responsive to the out-of-phase signal for amplifying the voltage signal to a level normally required to adjust the speed of the second motor to bring in phase the first and second frequency signals where, due to the application of the reversal signal to the controlling means, the amplified voltage signal facilitates rapid slowing of the second motor in the first direction and eventual operation in the second direction.

8. The system as set forth in claim 7 which further comprises an impedance feedback circuit connected between the input and output of the amplifying means.

9. The system as set forth in claim 8 wherein the feedback circuit includes a plurality of selectable impedance levels for establishing different amplification levels of operation for the amplifying means; and wherein the system further comprises means, responsive to the out-of-phase signal, for selecting one of the impedance levels of the feedback circuit.

10. A system for controlling the in-phase operation of two motors, which comprises:

means for generating a first frequency signal in response to the speed of the first motor;

means for generating a second frequency signal in response to the speed of the second motor;

a frequency-to-voltage converter coupled to the first frequency signal generating means for developing a voltage signal at a level representative of the speed of the first motor;

a phase comparator coupled to the first and second frequency signal generating means for comparing the phase relationship of the frequency signals and for developing a phase-relation signal;

a detection circuit coupled to the output of the phase comparator and responsive to the phase-relation signal for developing one of three feedback control signals where the three signals represent (1) the second frequency signal leading in phase the first frequency signal, (2) the second frequency signal lagging in phase the first frequency signal and (3) the first and second frequency signals being in phase;

an amplifier coupled to the output of the frequency-to-voltage converter for amplifying the voltage signal;

a feedback circuit connected between the output and the input of the amplifier and including three selectable levels of impedance for connection across the amplifier to obtain different levels of amplification;

a switching network coupled to the detection circuit and responsive to the feedback control signals for facilitating the selection and connection of one of the impedance levels of the feedback circuit across the amplifier;

means for controlling the speed of the second motor; and means for feeding the voltage signal from the amplifier to the controlling means to control operation of the second motor.

11. The system as set forth in claim 10, which further comprises:

means responsive to the voltage signal for developing a positive voltage to control the second motor for operation in a first direction and for developing a negative voltage to control the second motor for operation in a second direction;

means for establishing a count representing the selected rotational distance of travel of the second motor in each of the first and second directions;

means for generating a count signal in response to the actual rotational distance of travel of the second motor in the first and second directions;

a counting comparator coupled to the count-establishing means and the count-signal generating means for generating reversal signals for the second motor when the established and generated counts coincide; and means responsive to the reversal signals for selectively applying the positive and negative signals to the controlling means to selectively and alternately operate the second motor in the first and second directions.

* * * * *